United States Patent [19]

Ishii et al.

[11] Patent Number: 5,051,970

[45] Date of Patent: Sep. 24, 1991

[54] MAGNETO-OPTIC RECORDING SYSTEM WITH OVERWRITE CAPABILITY

[75] Inventors: Osamu Ishii; Koutarou Nonaka; Iwao Hatakeyama, all of Ibaragi; Tetsuo Iijima, Tokyo, all of Japan

[73] Assignee: Nippon Telegraph and Telephone Corporation, Tokyo, Japan

[21] Appl. No.: 188,876

[22] Filed: May 2, 1988

[30] Foreign Application Priority Data

| May 8, 1987 | [JP] | Japan | 62-110864 |
| Sep. 11, 1987 | [JP] | Japan | 62-226658 |
| Oct. 13, 1987 | [JP] | Japan | 62-256386 |
| Feb. 5, 1988 | [JP] | Japan | 63-23948 |
| Apr. 4, 1988 | [JP] | Japan | 63-81232 |
| Apr. 6, 1988 | [JP] | Japan | 63-83032 |

[51] Int. Cl.$^5$ ............................................. G11B 13/04
[52] U.S. Cl. ...................................... 369/13; 360/59; 360/114; 365/122
[58] Field of Search .............. 369/13, 275.3; 360/59, 360/114, 131, 135; 365/122; 235/494

[56] References Cited

U.S. PATENT DOCUMENTS

| 4,340,914 | 7/1982 | Hanaoka | 360/59 |
| 4,645,722 | 2/1987 | Katayama et al. | 360/131 |
| 4,694,358 | 9/1987 | Muchnik et al. | 360/59 |
| 4,730,289 | 3/1988 | Saitoh et al. | 369/13 |
| 4,805,043 | 2/1989 | Doyle | 360/59 |
| 4,817,067 | 3/1989 | Takahashi et al. | 369/275.3 |
| 4,910,725 | 3/1990 | Drexler et al. | 235/494 X |

FOREIGN PATENT DOCUMENTS

| 0051296 | 5/1982 | European Pat. Off. |
| 3619618 | 12/1986 | Fed. Rep. of Germany |
| 59-104730 | 6/1984 | Japan |

OTHER PUBLICATIONS

A Magneto-Optic Recording System Using TbFeCo, pp. 1624–1628, IEEE Transactions on Magnetics, vol. mag-21, No. 5, Sep. 1985.

High Speed Overwritable Magneto-Optic Recording Proc. Int. Symp. on Optical Memory, 1987, Japanese Journal of Applied Physics, vol. 26 (1987) supplement 26-4, pp. 149-154.

*Primary Examiner*—Stuart S. Levy
*Assistant Examiner*—Hoa T. Nguyen
*Attorney, Agent, or Firm*—Armstrong, Nikaido, Marmelstein, Kubovcik & Murray

[57] ABSTRACT

An overwritable magneto-optic recording system has a recording medium with a substrate, a recording magnetic film and a reproducing magnetic film deposited on the substrate. The reproducing magnetic film has a Curie temperature lower than that of the recording magnetic film, and coercive force Hc higher than that of the recording magnetic film. In a write process, a magnetic head writes data magnetically on the recording magnetic film, then, in a transfer process, an optical head (which is positioned downstream along the relative movement of the recording medium and the optical head) heats the recording medium higher than the Curie temperature of the reproducing magnetic film so that the reproducing magnetic film loses its magnetic property. During the cooling period after heating, recorded bits in the recording magnetic film are transferred to the reproducing magnetic film which restores its magnetic property. In the reproducing process, the optical head irradiates the reproducing magnetic film by a polarized coherent beam, and the data is reproduced on the principle that the polarization of the reflected beam depends upon the recorded data based on the Kerr effect. Thus, the high speed recording defined by a magnetic recording, and high density recording defined by an optical recording are obtained. Overwrite is possible merely by writing data by the magnetic head as in the case of the write process.

36 Claims, 7 Drawing Sheets

MAGNETO-OPTIC RECORDING SYSTEM WITH OVERWRITE CAPABILITY

BACKGROUND OF THE INVENTION

The present invention relates to a magneto-optic recording system, in particular, relates to an overwritable type of system.

A prior optical disk has the advantage that the recording capacity is extremely large. However, it has the disadvantage that the recorded portion cannot be erased.

An erasable optical disk is described in page 1624–1628, IEEE Transactions on magnetics, vol. mag-21, No. 5, September 1985. In that publication, an optical disk which is magnetized initially is illuminated by a laser beam under a bias magnetic field less than the anisotropic field in the opposite direction to the initial magnetic field in order to raise the temperature higher than the Curie temperature. When the optical disk is cooled, the magnetization of each cell is changed to the direction of the bias field. The information data relates to on/off of the laser beam so that the direction of the magnetization relates to the binary information data.

However, the disk has the disadvantage that the disk must be initialized in each recording operation by illuminating the disk with the laser beam in the initial field so that the disk is heated and is erased. In other words, the magnetization of the disk must be directed in one direction before recording, or the disk must be erased before recording. Therefore, no overwriting is possible in that prior disk, and so, high speed access to a disk was impossible. Therefore, an overwritable optical disk has been desired.

An overwritable optical disk is described in Proc. Int. Symp. on Optical Memory, 1987, Japanese Journal of Applied Physics, Vol. 26 (1987) Supplement 26-4, pp1149–1154. In that publication, a recording layer is TbFeCo layer, and a recording head has both an optical head and a magnetic head. The recording layer is first heated by the optical head, and then, in the cooling duration of the layer, the layer is recorded magnetically.

However, the overwritable optical disk has the disadvantages that a recording pit is not symmetrical and so noise is caused, and that the recording magnetic field disturbs the positioning operation of the optical head.

Another overwritable optical disk is described in DE OS 3619618, in which a pair of magnetic layers with different Curie temperatures are used. A first layer is magnetically initialized in one direction, and new data is recorded by a laser beam which is modulated by a binary data under a bias field opposite to the initialization field. When data "1" is written, the laser beam is strong enough for heating two magnetic layers higher than the Curie temperatures, and so, the resultant magnetic field after cooling is defined by the bias magnetic field. On the other hand, when data "0" is written, the laser beam is controlled so that the first layer does not lose its magnetization, but the other magnetic layer loses its magnetization, and so, the resultant magnetic field after cooling is defined by the initial field.

However, the prior art has the disadvantage that the control of the operation is complicated, since the strength of a laser beam must be modulated by binary recording data.

SUMMARY OF THE INVENTION

It is an object, therefore, of the present invention to overcome the disadvantages and limitations of the prior magneto-optic recording system by providing a new and improved magneto-optic recording system.

It is also an object of the present invention to provide a magneto-optic recording system which does not need a particular erase process.

It is also an object of the present invention to provide a magneto-optic recording system which uses a separate optical head from a magnetic head so that the undesired influence to the optical head by a magnetic head is removed.

It is also an object of the present invention to provide a magneto-optic recording system in which the laser beam power is constant, but is not modulated by binary recording data.

The above and other objects are attained by a magneto-optic recording system comprising (a) a magneto-optic recording medium comprising a substrate having a plurality of recording tracks, the substrate being provided with a first magnetic film with a predetermined first Curie temperature and a predetermined first coercive force, and a second magnetic film with a predetermined second Curie temperature and a predetermined second coercive force, the first Curie temperature being higher than the second Curie temperature, and the first coercive force being lower than the second coercive force; (b) a magnetic head positioned close to the magneto-optic recording medium, having a core and a coil wound on the core, to record magnetically a signal applied to the coil, with a magnetic field which is higher than the first coercive force and lower than the second coercive force; (c) a heating device located downstream along relative movement path of the recording medium, for selectively heating the recording medium to a temperature which is higher than the second Curie temperature and is lower than the first Curie temperature, to transfer the magnetic pattern recorded on the first magnetic film to the second magnetic film; and (d) an optical head having at least a laser source and a laser sensor, located close to the recording medium, for reproducing signals recorded on the second magnetic film by illuminating the second magnetic film with a coherent laser beam and sensing polarized angle depending upon the signal recorded on the second magnetic film.

Another feature of the present invention resides in a magneto-optic recording medium comprising a substrate having a plurality of recording tracks; a first magnetic film having a predetermined first Curie temperature and a predetermined first coercive force; a second magnetic film having a predetermined second Curie temperature and second coercive force; the first Curie temperature being higher than the second Curie temperature and the first coercive force being lower than the second coercive force.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
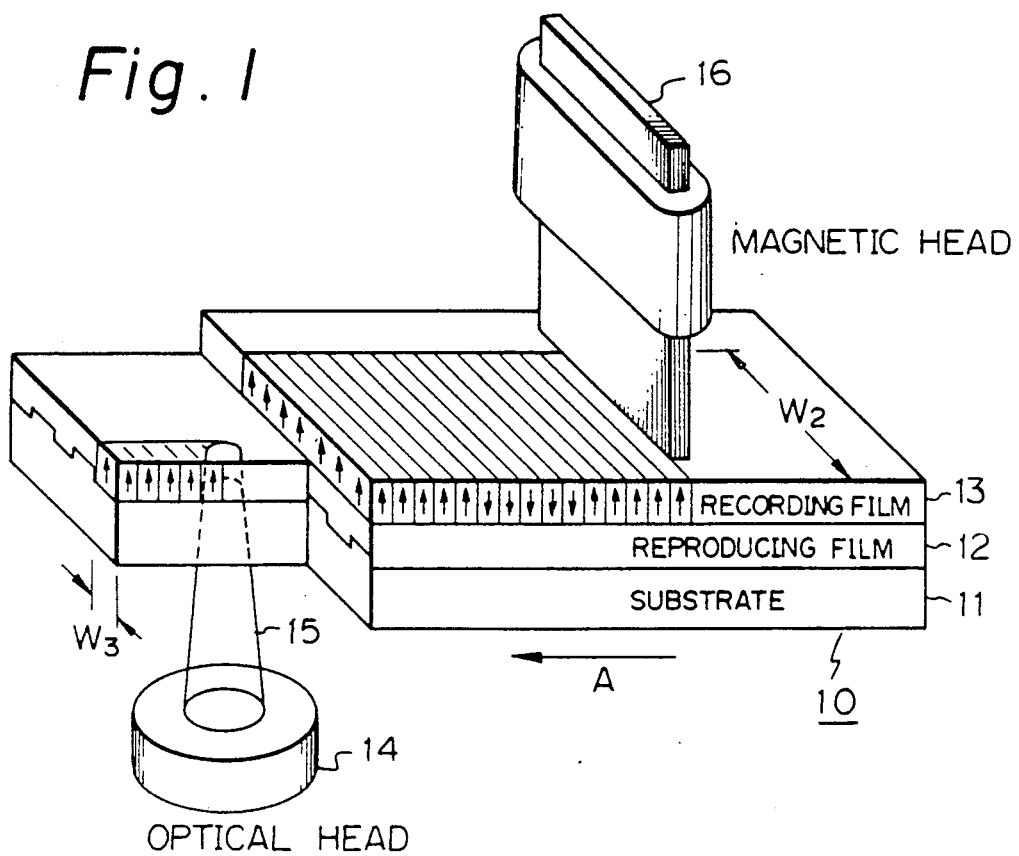
FIG. 1 is a perspective view of the recording medium according to the present invention.
Figure 2:
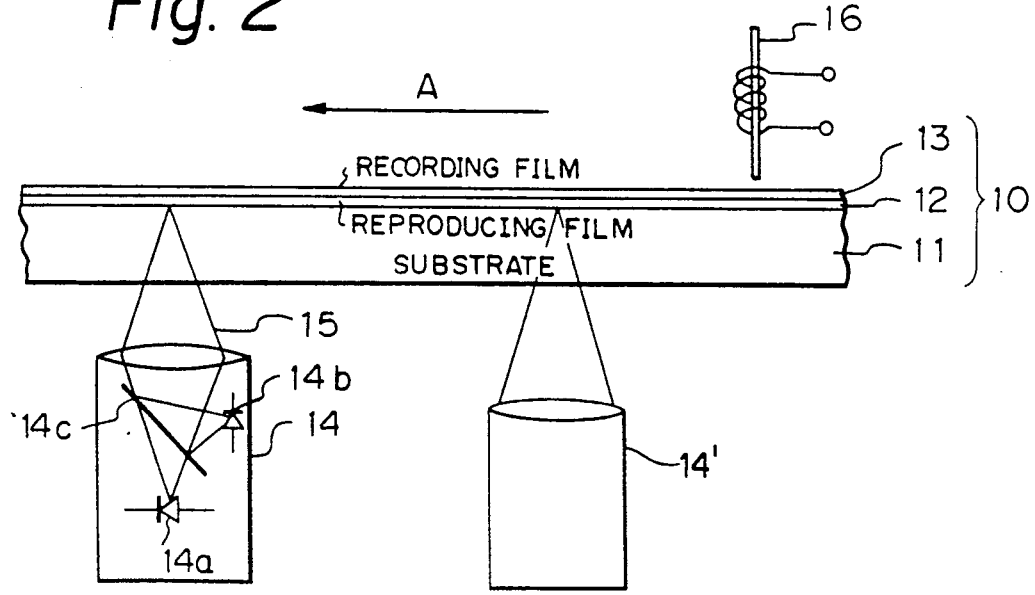
FIG. 2 is a cross sectional view of the recording medium according to the present invention.

FIG. 1 shows a perspective view of the magneto-optic recording system according to the present invention, and FIG. 2 is a cross sectional view of FIG. 1. In those figures, the recording medium is shown by the numeral 10, which has a transparent substrate 11 made of glass. The substrate 11 has a plurality of concentric grooves which function as recording tracks, and the grooves are made by using the conventional photolithographic process after photo-polymer is painted on the glass. The second reproducing magnetic film 12 made of 77 at % Fe—23 at % Tb is sputtered on the substrate 11 to the thickness 600 °Å, where at % indicates atomic percent. The first recording magnetic film 13 made of 80 at % Co—20 at % Cr is provided in the thickness of 1000 Å to the second reproducing magnetic film 12.

The first recording magnetic film 13 is a recording film which has relatively high Curie temperature. In the present embodiment, the direction of the magnetization in the recording film 13 is in the thickness direction of the film, that is to say, vertical recording is used. The second reproducing magnetic film 12 is called a reproducing film having the higher coercive force than that of a first recording magnetic film 13, and a lower Curie temperature than that of the first recording magnetic film 13. The second reproducing magnetic film 12 is also magnetized in the thickness direction for vertical recording.

The numeral 14 is an optical head which functions both to transfer the recorded data on the recording film 13 to the reproducing film 12, and to read the data on the reproducing film 12. The optical head 14 has an optical source 14a for illuminating the medium 10 with a coherent laser beam, a photo-detector 14b for sensing the optical beam reflected by the recording medium 10, and a half mirror 14c which transmits the light of the optical source 14a, but off-sets the reflected beam to the photo-detector 14b. The reproduction of the recorded data is performed by using the Kerr effect in which the polarization angle depends upon the recorded data. A polarizer and a polarization detector (not shown) are mounted in the optical head 14.

Numeral 16 is a magnetic head for recording. In the present embodiment, the magnetic head is a main-pole driven single pole type for vertical recording. Of course, other magnetic heads, like, a ring type head, or an auxiliary-pole-driven single pole type head is possible for vertical recording. The width of the main pole of the magnetic head 16 is about 300 $\mu$m, which is considerably large as compared with the width of a track which is about 1.6 $\mu$m. The present invention has the advantage that the high density recording on a track of 1.6 $\mu$m width is carried out by using the wide magnetic head with the width of 300 $\mu$m, as described later.

In operation, it is assumed that the recording medium 10 rotates so that the medium 10 moves in the direction of arrow A in the figures. The magnetic head 16 records binary data on the first recording magnetic film 13. The process of the magnetic recording in the present invention is similar to that of a conventional magnetic recording process. The recording field is for instance 4000 Oe (oersted), which is higher than the coercive force Hc of the first recording magnetic film 13. The coercive force Hc of Co—Cr film is for instance 700 Oe. Therefore, the first recording magnetic film 13 is magnetized according to the recording data. On the other hand, the second reproducing magnetic film 12 made of Tb—Fe has the coercive force Hc of 15000. Oe, and therefore, the second reproducing magnetic film 12 is not magnetized by the recording field generated by the magnetic head 16.

Next, in transfer process, the recording medium 10 is heated by the laser beam 15 by the optical head 14. The beam power of the laser 14a is about 10 mW, which may raise the temperature of the illuminated portion of the recording medium 10 up to 150° C. The Curie temperature of the second reproducing magnetic film 12 made of Tb—Fe is 125° C., and the Curie temperature of the first recording magnetic film 13 made of Co-Cr is about 600° C. The laser beam 15 of the optical head 14 has the beam diameter about 1 $\mu$m, and both the first recording magnetic film 13 and the second reproducing magnetic film 12 are heated by the laser spot to 150° C. When the films 12 and 13 are heated by the laser spot, the second film 12 (reproducing film) which has a lower Curie temperature loses its magnetization, while the first film 13 (recording film) retains its magnetization. Thus, the magnetic medium according to the present invention is first recorded magnetically by a magnetic head, and then, upon movement of the medium, the medium is heated by an optical head 14 which is located downstream of the magnetic head 16 along the moving path of the medium 10.

Next, when the medium 10 moves further, and the temperature of the medium irradiated by the laser beam 15 is decreased, the reproducing film 12 has its magnetization again, and is magnetized in the same direction as that of the recording film 13 which is positioned close to the reproducing film 12. Thus, the magnetic pattern on the recording film 13 is transferred to the reproducing film 12 by heating and cooling the films 12 and 13.

It should be appreciated that the width $W_3$ of a track on the reproducing film 12 is defined by the spot size of the laser beam 15, in spite of the width $W_2$ of the magnetic head 16, therefore, the present invention can provide high density recording defined by an optical beam spot.

The reproduction of the recorded data is performed under the principle of the Kerr effect in which the polarization angle of a reflected beam depends upon the recorded data.

In the reproducing process, the medium 10 is irradiated by the laser beam 15 which has the power of 2 mW, so that the reproducing film 12 is not heated to the Curie temperature. The beam reflected by the reproducing film 12 carries the recorded information, and the reflected beam is sensed by the photo-detector 14b through the half mirror 14c. The reproducing operation using the Kerr effect is conventional.

The overwriting on the present recording medium 10 is performed merely by repeating a write operation mentioned above, by inputting data to the magnetic head, and by transferring data from the recording film to the reproducing film.

The residual component which is not erased in the overwrite operation is about −40 dB, which is sufficiently low. The head fringing field in the overwrite operation magnetizes only the recording film 13, but does not affect the reproducing film 12, since the reproducing film 12 has the much higher coercive force Hc than that of the recording film 13.

EXPERIMENT 1

The magnetic binary bits with bit length of 10 μm are recorded on the recording film 13, then, the data is transferred to the reproducing film by irradiating the films by a laser beam of 10 mW of power and 1 μm of spot size (diameter). The signal to noise ratio (S/N) of the reproduced signal is 25 dB. Next, we overwrite on the written area of the medium by the bit length of 15 μm. When we reproduce the overwritten data, after transferring the overwritten data to the reproducing film by heating the films by using the laser beam, the signal to noise ratio of the overwritten reproducing signal is 20 dB.

It should be appreciated that the optical head 14 in FIGS. 1 and 2 functions both as the heating means for the transfer process, and as the reproducing head for the reproducing phase, by switching the strength of the laser beam. It should be understood of course that a heating means 14' may be separated from a reproducing optical head 14, depending upon the design choice of the system.

The present invention has the advantages as follows. Firstly, the overwritable magneto-optical recording is obtained without using a particular erasing operation. Secondly, the high speed recording defined by a magnetic recording, together with the high density recording as defined by the optical recording, are obtained simultaneously. The high speed recording up to 50-60 MHz, and high density recording using μm order of track width are obtained by the present invention. Further, since the recording width of a magnetic head is rather wide, no specific track servo operation for a magnetic head is necessary, and a conventional magnetic head for a wide track is available for high density recording. Further, the reproducing signal is free from noise caused by dust and/or defects in the magnetic films, since the reproducing beam irradiates the magnetic films through a glass substrate.

A recording magnetic film is not restricted to Co—Cr, but also amorphous of rare earth element and transition metal element alloy, Barium ferrite, and Co—Cr films with some additives are available. Further, when longitudinal magnetic recording is used instead of vertical recording $\gamma$—$Fe_2O_3$ film is available as a first recording magnetic film.

Also, a reproducing magnetic film is not restricted to Tb—Fe, but Mn—Bi alloy, amorphous of rare earth elements and transition metal alloy, YIG, and Co-ferrite films are available, so long as it is magnetized in the thickness direction, and can have a lower Curie temperature than that of a recording film, and higher coercive force than that of a recording film.

An example that rare earth-transition alloy as recording film is described in the experiment 1A below.

EXPERIMENT 1A

The recording magnetic film may be made of rare earth-transition metal alloy. By selecting the composition of the film, Curie temperature and coercive force are widely controlled. For example, a Gd-transition metal alloy has a higher Curie temperature and a lower coercive force than those for a Tb-transition metal alloy. A 23 at % Tb+77 at % Fe film (reproducing film), 0.1 μm thick, is deposited on the Gd+Tb+Fe film. Curie temperature and coercive force of the Tb+Fe film are 125° C. and 15000 Oe, respectively. A 20 at % Gd+5 at % Tb+75 at % Fe film (recording film), deposited on a pregrooved glass substrate by RF-magnetron sputtering method, has 180° C. Curie temperature and 800 Oe coercive force. The film thickness is 0.3 μm. The 0.1 μm thick protection film of $SiO_2$ is coated on the reproducing film.

An auxiliary-pole-driven single pole type magnetic head is used for writing the data. A single pole thickness is 3 μm and core width is 300 μm. The pole is made of pure iron. This single pole contacts the recording medium and sliding at relative velocity of 10 cm/sec All-one bits with 10 μm length are recorded on the recording film. At that time, the magnetic field caused by the auxiliary-pole is 400 Oe. Next, the optical head is used for transfer and reproducing process. A laser beam with 0.7 μm diameter and 6 mW power irradiates through the glass disk substrate to transfer the magnetic information from a recording film to a reproducing film. Then, the laser beam with power of 1 mW is used for reproducing the transferred data. In both transfer and reproducing process a relative velocity is 5 m/sec. The C/N ratio for the reproduced data is 40 dB.

By repeating the same recording, transfer and reproducing conditions, overwrite operation is completed. After the overwrite sequence, the component of the former recorded data is reduced by −35 dB.

Figure 3:
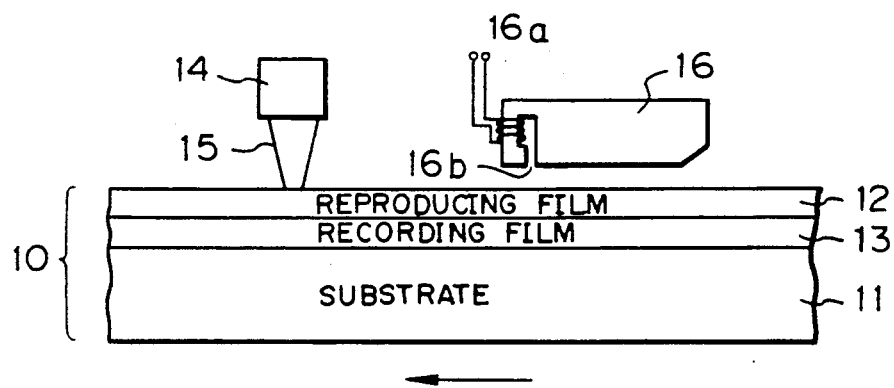
FIG. 3 shows another embodiment of the magneto-optic recording system according to the present invention.

FIG. 3 shows another embodiment of the present invention, in which the same numerals in FIG. 3 show the same members as those in FIG. 1 and FIG. 2. The feature of FIG. 3 is that the optical head 14 resides on the same side as that of the magnetic head 16, in view of the recording medium 10, while those heads are located on opposite sides of the recording medium in the previous embodiment. The magnetic head 16 in FIG. 3 is a ring type head having a core with a gap 16b, and a coil 16a wound on the core. The ring type head is also available for longitudinal recording.

Since the magnetic head 16 and the optical head 14 reside on the same side of the recording medium, the sequence of two magnetic films 12 and 13 is opposite to that of the previous embodiment of FIGS. 1 and 2. That is to say, in the embodiment of FIG. 3, the recording magnetic film 13 is attached on the substrate 11, and the reproducing magnetic film 12 is attached on the recording magnetic film 3. The substrate 11 may not be transparent in this embodiment, since the optical head 14 does not read the reproducing film through the substrate. If the recording film 13 is transparent, the sequence of the two films may be that of FIG. 1 so that the optical head 14 reads the reproducing film 12 through the recording film 13.

The embodiment of FIG. 3 has a similar effect to that of the previous embodiment.

Figure 4:
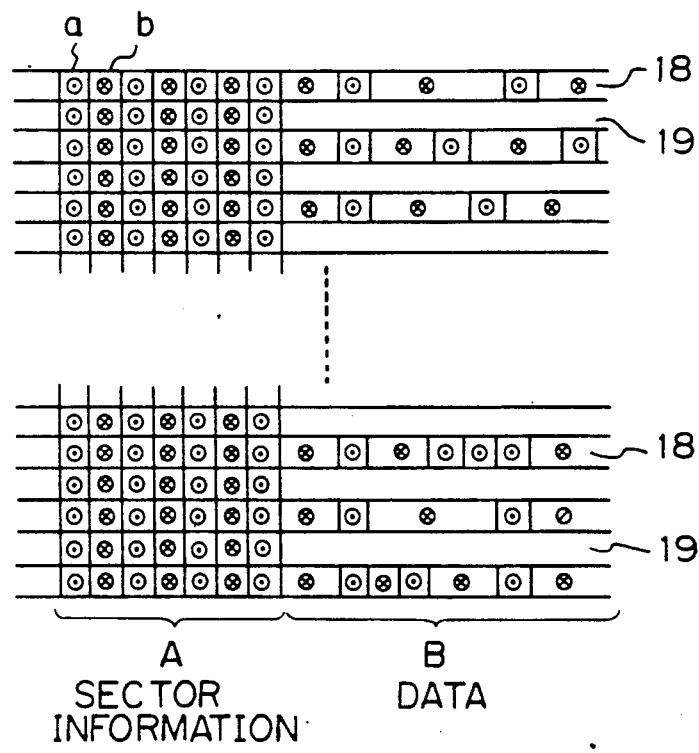
FIG. 4 shows pattern of sector information recorded on the recording medium, according to the present invention, FIG. 5(a-c) show the modification of the magneto-optic recording medium according to the present invention, FIG. 6(a-b) are another modification of the magneto-optic recording medium according to the present invention.

Next, the synchronization between the write operation and the read operation is described in accordance with FIGS. 4 through 6.

Since the present invention has a magnetic write head and an optical read head with some spacing, the synchronization between write data and read data must be considered.

FIG. 4 is one solution for the synchronization. In FIG. 4, sector information A is written in advance in the perpendicular direction to the data tracks in both the recording film 13 and the reproducing film 12, so that the width of the sector information A is wider than the width of a recording track written by a magnetic head 16. The symbols (a) and (b) in FIG. 4 show the vertical magnetization in the up or down direction of the paper. The numeral 18 is a land portion and 19 is a groove portion of a substrate.

In the write process, the magnetic head 16 first writes out the sector information A, and then, a clock signal in a write circuit (not shown) is synchronized with the sector information. Then, the magnetic head 16 writes data on the track just after the sector information A in synchronization with an operational (or system) clock signal.

In the transfer process, the magnetic pattern on the recording film is transferred to the reproducing film by heating the medium.

In the reproducing process, the optical head 14 first reads out the sector information on the reproducing film, then, the clock signal in a read circuit (not shown) is synchronized with the sector information. Then, the optical head 14 reads out the data on a track in synchronization with an operational clock signal.

It should be appreciated that the sector information which is once recorded is never erased in a plurality of overwriting operations since it is written on both the recording film and the reproducing film, and so it is used as a reference of position in both the write process and reproducing process. Thus, the correct read operation which synchronizes with the sector information is assured. In a preferred embodiment, the sector information A is binary bits with a length of 20 μm, a number of bits of the sector information along the moving direction of a track is 100, the width of a write track by magnetic head is 300 μm, and the spot diameter of a laser beam is 1 μm. In our experiment, in the preferred embodiment, the relative error between the read out signal and the operational clock signal is less than 4%, which shows that the synchronization between the write process and the read process is complete.

It is preferable that a transfer process which is carried out just after the write process is also synchronized with the sector information by reading the sector information by an optical head. Alternatively, a coarse synchronization in which an optical head is energized to heat the medium after a predetermined time after the write process, may be possible, since the transfer process does not need strict synchronization like the write process and the read process.

Figure 5A:
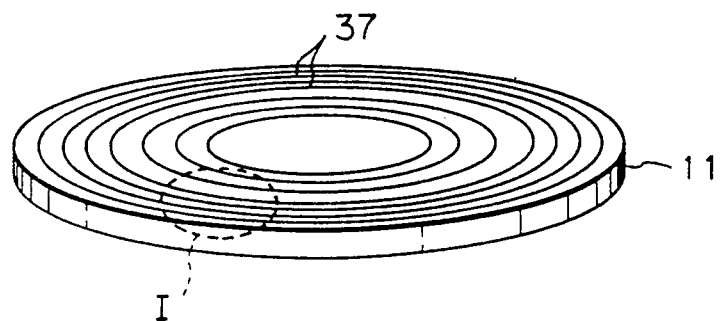
Figure 5B:
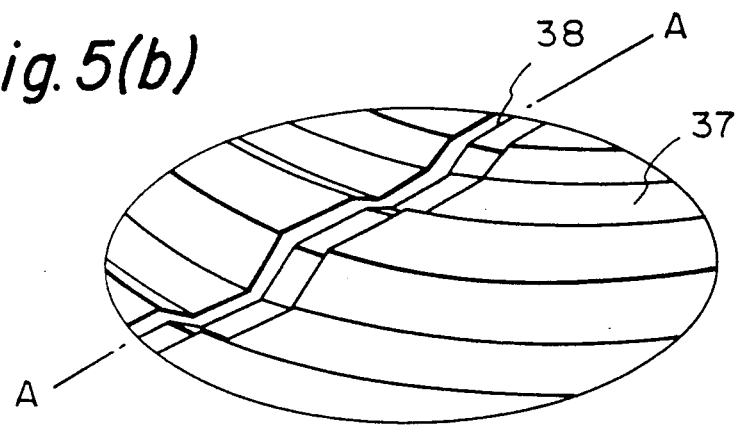
Figure 5C:
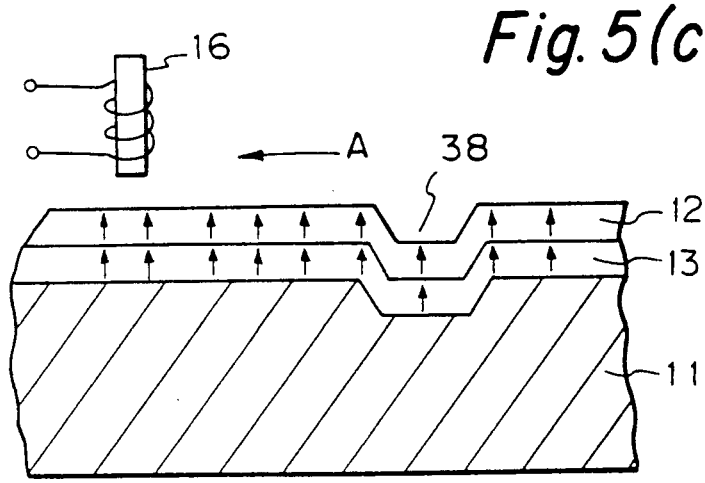
Figure 6A:
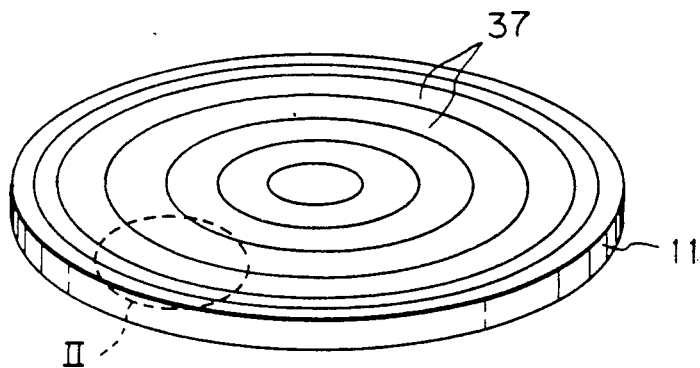
Figure 6B:
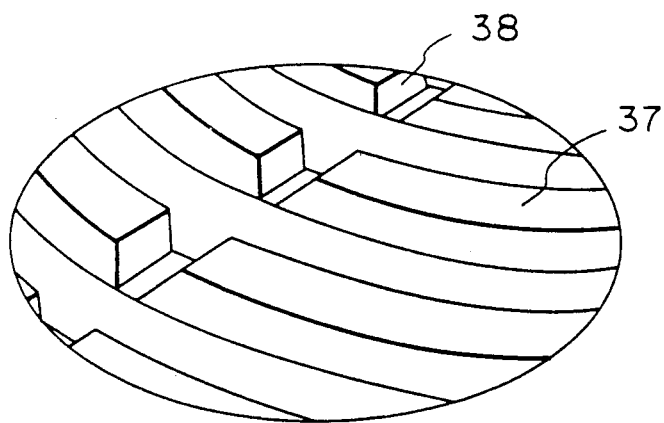

Another, embodiment of the sector information, which is used to synchronize of the write and the read operations, is described in accordance with FIGS. 5 through 6. In those figures, a disk shaped substrate for magneto-optic recording is provided with concentric grooves 37 for data tracks in the circumferential direction of the disk, and at least one linear groove 38 in the radial direction. The radial direction groove 38 is perpendicular to the circumferential grooves 37. FIG. 5b is the enlarged view of the portion I of FIG. 5a, and FIG. 6b is the enlarged view of the portion II of FIG. 6a. FIG. 5c is the enlarged cross section along A—A of FIG. 5b.

FIG. 5 is the embodiment that the radial direction groove 38 is provided on both the land portion and the groove portion of the circumferential grooves 37, and FIG. 6 is the embodiment that the radial direction groove 38 is provided on only the land portion of the circumferential grooves 37.

In those embodiments in FIGS. 5 through 6, it is assumed that the whole area of the recording film and the reproducing film is initially magnetized in the vertical direction of the film plane. The magnetic field for that magnetization is for instance 20 KOe, which is higher than the coercive force Hc of both the recording film and the reproducing film. It should be noted that the radial direction groove 38 is essentially wide sector information which is wider than a track width, since the radial direction groove 38 extends over all circumferential tracks.

In the write process, a magnetic head 16 first reads out the initially recorded sector information. It should be appreciated that the magnetic head 16 can recognize the location of the radial direction groove 38, since the read out level by the magnetic head 16 depends upon the separation between the magnetic head 16 and the surface of the magnetic medium 31. In the radial direction groove portion, it should be noted that the head-medium separation depends upon whether the head 16 faces with the land portion of a track, or a groove portion (radial groove) of a track. In other word, the read out level is decreased at the radial direction groove portion, since the separation between the head 16 and the recording medium is large at that portion, as shown in FIG. 5c. Thus, the magnetic head recognizes the radial direction groove by the read out level.

When the magnetic head 16 recognizes the radial direction groove 38, the information data is recorded after the radial direction groove 38.

In the reproducing process, the strength of the reflected beam depends upon whether it is on the radial direction groove or not. Therefore, the optical head can recognize the position of the radial direction groove 38. When the radial direction groove is recognized, a clock signal of a reproducing device is synchronized with the sector information, i.e. radial direction groove and the data is read out using the clock signal. Thus, in our experiment, the error between a clock signal and a reproduced signal is less than 4 %, which shows that the synchronization is complete.

In the above embodiment, a bit length of initial magnetic recording for data is 2 μm, and the spot diameter of a laser beam is 1 μm.

Figure 7:
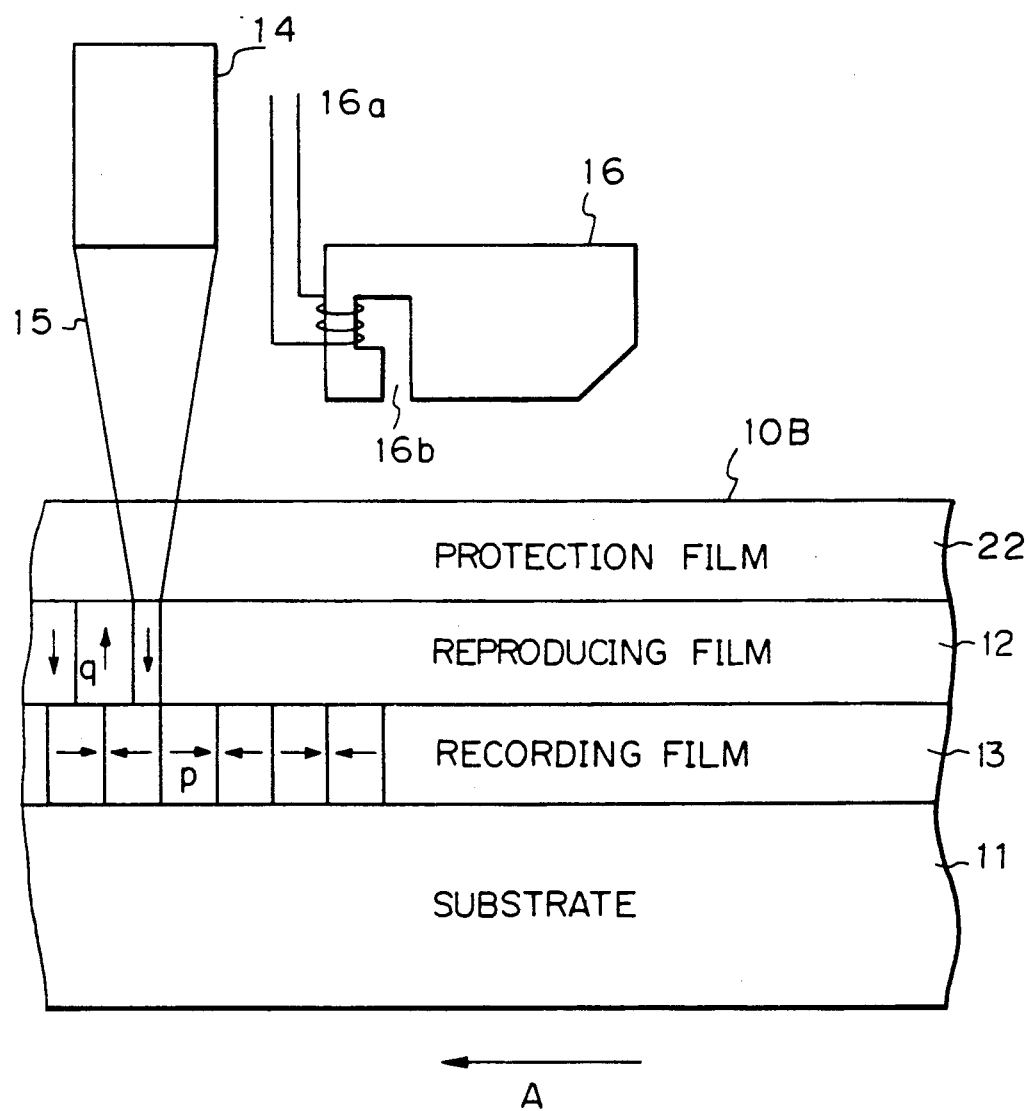
FIG. 7 is another embodiment of the magneto-optic recording system according to the present invention.

FIG. 7 shows the structure of another embodiment of the recording medium according to the present invention. In the figure, the recording medium 10B has a substrate 11, a recording magnetic film 13 attached on the substrate 11, a reproducing magnetic film 12 attached on the recording magnetic film 13, and a protection film 22 attached on the reproducing magnetic film 12. The numeral 14 is an optical head, 15 is a laser beam, and 16 is a magnetic head with a ring type head core and a coil wound on the core. The numeral 16a is a coil wound on the core, and 16b is a gap of the ring type head core of the magnetic head 16.

The feature of the embodiment of FIG. 7 is that the recording film 13 is recorded with the magnetization directed in the plane direction of the recording film 13 (plane recording), while the embodiment of FIG. 1 records the signal by the vertical magnetization which is vertical to the plane direction of the recording film (vertical recording). The arrow p shows the direction of the magnetization in the recording magnetic film 13, and the arrow q shows the direction of the magnetization in the reproducing magnetic film 12. Even when the recording film is magnetized in the plane direction, it is possible to transfer the magnetization in the recording film 13 to the reproducing film 12, since the plane magnetization in the recording film 13 causes some vertical component of magnetic flux. The direction of the magnetization in the reproducing film is still in the thickness direction.

EXPERIMENT 2

A glass disc is used as a substrate 11. The recording magnetic film 13 made of $-Fe_2O_3$ with the additive of 2.0 at % Co+2.0 at % Ti+1.5 at % Cu is sputtered on the substrate 11 at the thickness of 0.17 $\mu$m. Then, the reproducing magnetic film 12 made of 77 at % Fe−23 at % Tb is attached on the recording magnetic film 13 at a thickness of 0.1 $\mu$m. The protection film 22 made of $SiO_2$ is coated on the reproducing magnetic film 12 in order to protect the reproducing magnetic film 12. The magnetic characteristics of the films 12 and 13 are shown in table 1.

TABLE 1

|  | $\gamma$-Fe$_2$O$_3$ with 2.0 at % Co + 2.0 at % Ti + 1.5 at % Cu | 23 at % Tb − 77 at % Fe |
|---|---|---|
| Coercive force (Oe) | 700 | 15000 |
| Saturation magnetism (emu/cc) | 250 | 50 |
| Curie temperature (°C.) | 585 | 125 |

The magnetic head 16 is a ring type head made of Mn—Zn ferrite, having a core width of 18.5 $\mu$m, a gap length of 0.85 $\mu$m, and the number of windings of coil is 36. The spacing between the magnetic head 16 and the recording medium 10B is 0.27 $\mu$m when the recording medium rotates with the circumferential velocity 20 m/sec.

In a write process, a signal with bit length 2 $\mu$m is recorded by the write current 25 mA. This is a longitudinal recording. Then, the recording medium is heated up to 140° C. to transfer the magnetism on the recording film 13 to the reproducing film 12. In a reproducing process, the optical head 14 reads out the signal on the reproducing film 12 according to the Kerr effect principle. The laser beam power in the reproducing process is 1 mW, and the circumferential velocity is 5 m/sec. The C/N ratio of the reproduced signal is 45 dB.

In order to test the overwrite characteristics, a bit of 3 $\mu$m length is recorded by the magnetic head 16. Then, the bit of 3 $\mu$m length is transferred to the reproducing magnetic film 12 by heating the recording medium to 140° C., then, the optical head 14 reads out the 3 $\mu$m bit length signal. The C/N is 43 dB. The level of 2 $\mu$m length signal which is recorded previously has an output level which is lower than the 3 $\mu$m length signal by 36 dB. Thus, it is confirmed that the overwrite characteristics are excellent.

EXPERIMENT 3

Using the structure of FIG. 7, the recording magnetic film 13 made of $\gamma$-Fe$_2$O$_3$ with the additive of 1.0 at % Os at a thickness of 0.17 $\mu$m is attached on the substrate. Then, the reproducing magnetic film 12 made of 12 at % Co −65 at % Fe−23 at % Tb is attached on the recording magnetic film 13 at a thickness of 0.1 $\mu$m. The protection film 22 made of SiO$_2$ is attached on the reproducing film 12 at a thickness of 0.1 $\mu$m. Table 2 shows the magnetic characteristics of the recording magnetic film and the reproducing magnetic film.

TABLE 2

|  | $\gamma$-Fe$_2$O$_3$ with 1.0 at % Os | 23 at % Tb − 65 at % Fe − 12 at % Co |
|---|---|---|
| Coercive force (Oe) | 750 | 10000 |
| Saturation magnetism (emu/cc) | 260 | 60 |
| Curie temperature (°C.) | 585 | 210 |

The magnetic head is a ring type head made of Mn—Zn ferrite core with a core width of 18.5 $\mu$m, a gap length of 0.85 $\mu$m, and 36 turns of winding. The spacing between the head and the recording medium is 0.27 $\mu$m when the circumferential velocity of the recording disk is 20 m/sec.

In a write process, a bit of 2 $\mu$m length is recorded by the write current 25 mA. Then, the recording medium is heated to 250° C. to transfer the recorded pattern in the recording magnetic film to the reproducing film. In the reproducing process, the optical head 14 reproduces the signal on the reproducing film 12 under the condition that the laser power is 1 mW, and the circumferential velocity of the medium is 5 m/sec. The resultant C/N is 48 dB.

The overwrite characteristics are tested further. A signal of 3 $\mu$m length signal is overwritten on the recording film 13. Then, the recording medium is heated to 250° C. to transfer the pattern. The optical head 14 reads out the signal on the reproducing film. The C/N at that time is 45 dB. The level of 2 $\mu$m length signal which is recorded previously is lower than the 3 $\mu$m signal by 35 dB. Thus, it is confirmed that the overwrite operation is excellent.

The composition of the recording magnetic film and the reproducing magnetic film is analyzed.

The magnetic flux by a magnetic head is usually several thousands Oe. Therefore, it is preferable that the coercive force of the recording film is less than 2000 Oe. It should be noted that the coercive force of $\gamma$-Fe$_2$O$_3$ increases by adding Co or Os. The 2000 Oe of coercive force is obtained by adding Co by 8 at %, or Os by 3 at %. Therefore, it is preferable that the amount of the additive is less than 8 at % when the additive is Co, and is less than 3 at % when the additive is Os.

As for the reproducing magnetic film, it is essential that the coercive force at room temperature is higher than that of the recording magnetic film, and the Curie temperature is lower than that of the recording magnetic film. Preferably, the coercive force is higher than the magnetic field caused by the head, in order not to be recorded by a magnetic head. An amorphous film of rare earth element and transition metal alloy has the compensation composition in which the magnetic moment of rare earth element cancels that of the transition metal, and no resultant magnetization appears.

When the composition is close to the compensation composition, an extremely high coercive force is obtained. Therefore, it is preferable that the reproducing magnetic film made of amorphous thin film of rare earth element and transition metal is close to the compensation composition. The example of the compensation composition when the rare earth element is Tb and the transition metal is 85 at % Fe −15 at % Co is the composition that the ratio of Tb is 23 at %. On the other hand, the coercive force higher than 2 KOe is obtained when the ratio of Tb is in the range between 21 at % and 30 at %. Therefore, the preferable composition of the reproducing magnetic film is that Tb is included in the range from 21 at % to 30 at %.

Figure 8:
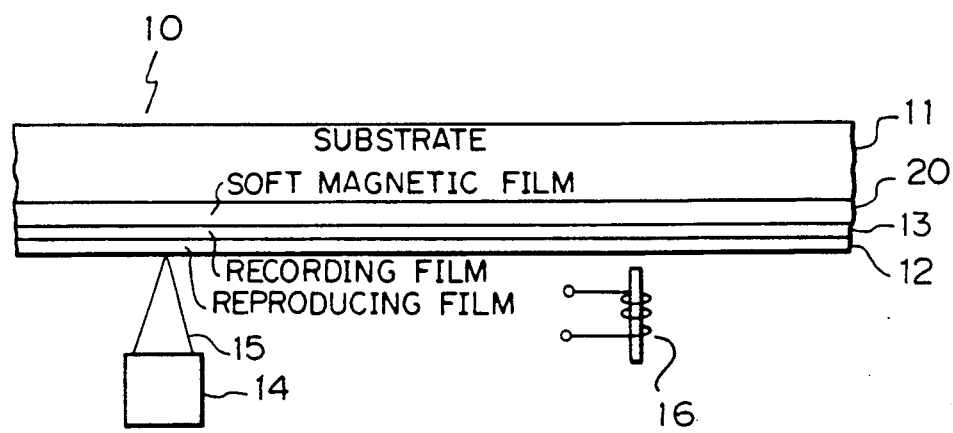
FIG. 8 is still another embodiment of the magneto-optic recording system according to the present invention.

FIG. 8 shows another embodiment of the magneto-optic recording medium according to the present invention. In the figure, the recording medium 10B has a substrate 11, a soft magnetic film 20 attached on the substrate 11, a first recording film 13 attached on the soft magnetic film 20, and a second reproducing magnetic film 12 attached on the first recording magnetic film 13. The numeral 14 is an optical head, 15 is a laser beam, and 16 is a magnetic head for vertical recording.

The feature of the embodiment of FIG. 8 is the presence of the soft magnetic film 20 between the first recording magnetic film 13 and the substrate 11.

EXPERIMENT 4

A soft magnetic film 20 made of 78 at % Ni − 22 at % Fe (permalloy) having initial permeability 4000 and Curie temperature 580° C. is attached on the substrate 11 at a thickness of 0.5 μm. Then, the first recording magnetic film 13 made of 78.5 at % Co − 21.5 at % Cr, having anisotropic field 4500 Oe and coercive force 1000 Oe, and Curie temperature 600° C. is attached on the said soft magnetic film 20 at a thickness of 1000° A. Then, the second reproducing magnetic film 12 made of 79 at % Fe − 21 at % Tb, having coercive force 15000 Oe and Curie temperature 125° C. is attached on the first recording magnetic film 13 at a thickness of 600 Å. The substrate 11 is made of glass having concentric track grooves produced through a photolithographic process after ultraviolet setting resin photo-polymer is painted on. The similar recording medium, which is the same as the above recording medium, except it has no soft magnetic film 20, is also prepared for the sake of comparison.

Figure 9:
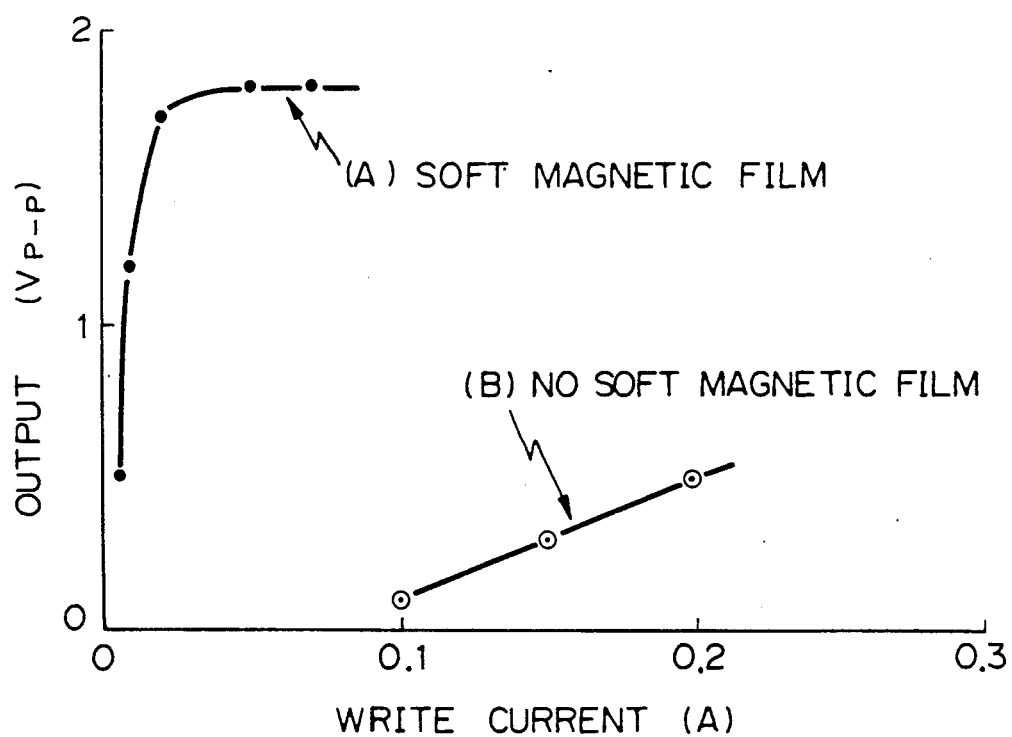
FIG. 9 shows the characteristics curve of the embodiment of FIG. 8.

The recording current in the magnetic head 16 for providing a predetermined reproducing output level is measured. FIG. 9 shows the curves of the experimental results, in which the horizontal axis shows the write current in the magnetic head 16, and the vertical axis shows the reproducing output level ($V_{p-p}$) Curve A in FIG. 9 shows the characteristics of the recording medium having the soft magnetic film, and curve B shows the characteristics of the recording medium having no soft magnetic film.

It should be noted in FIG. 9 that the write current for the recording medium having the soft magnetic film is considerably smaller as compared with that of the recording medium having no soft magnetic film.

Figure 10:
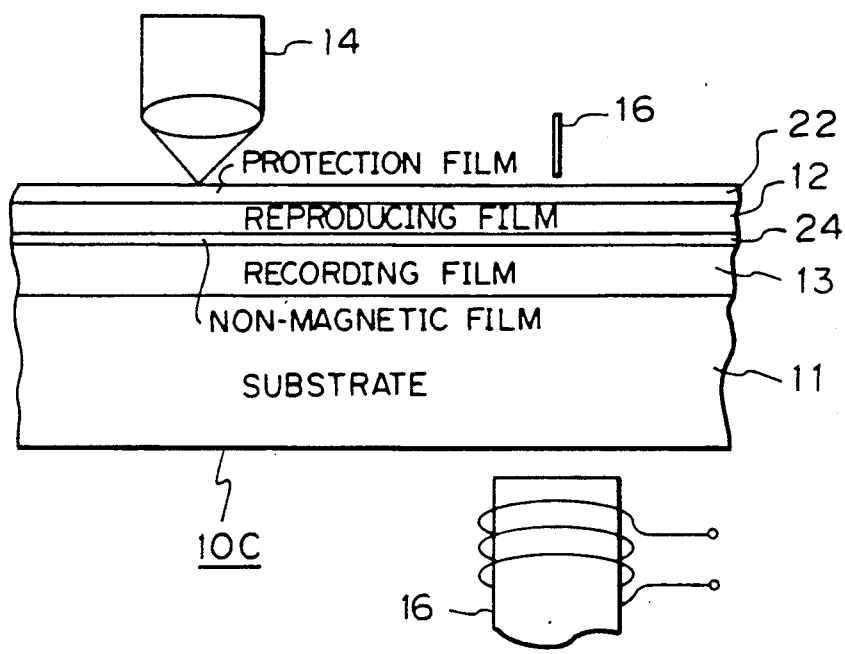
FIG. 10 is still another embodiment of the magneto-optic recording system according to the present invention.

FIG. 10 shows still another embodiment of the recording medium according to the present invention. In the figure, the recording medium 10C has a substrate 11, a first recording magnetic film 13 attached on the substrate 11, a non-magnetic intermediate film 24 attached on the first recording magnetic film 13, a second reproducing magnetic film 12 attached on the non-magnetic intermediate film 24, and a protection film 22 attached on the second reproducing magnetic film 13. The numeral 14 is an optical head, and numeral 16 is a magnetic head.

The feature of the embodiment of FIG. 10 is the presence of the non-magnetic intermediate film 24 between the first recording magnetic film 13 and the second reproducing magnetic film 12.

In our analysis, when the residual magnetization is lower than the saturation magnetization like Co—Cr film, a small reverse magnetic domain exists in each magnetic domain. Although the direction of the magnetic field in the magnetic domain is defined by the write signal, the small reverse magnetic domain having the opposite direction field exists in each magnetic domain. Therefore, when the storage in the recording film is transferred to the reproducing film, the transferred storage in the reproducing film is influenced by not only the main magnetic domain, but also by the small reverse magnetic domain. As a result, the presence of the reverse magnetic domain causes the increase of noise, and/or the decrease of reproducing signal level.

When the small reverse magnetic domain is assumed to be a stripe domain with the wavelength ($\lambda$), the vertical magnetic flux Hz in the thickness direction of a magnetic film is expressed by the following equation.

$Hz = k \exp(-2\pi z/\lambda)$ where k is constant, and z (μm) is length from film surface. Assuming that the small reverse magnetic domain is a crystal grain with the diameter about 500° Å, and the ($\lambda$) is about 0.1 μm, which is twice as large as the diameter, the value Hz is decreased to 1/1000 when the length z increases from 0 to 0.1 μm. Therefore, it should be noted that the presence of the non-magnetic intermediate film which is about twice as thick as the width of the small reverse magnetic domain can decrease considerably the influence of the small reverse magnetic domain. Thus, the reproducing magnetic film is recorded with only the desired signal.

The similar analysis is possible when the recording film is amorphous film of rare earth element and transition metal alloy.

EXPERIMENT 5

The recording medium of FIG. 10C is manufactured. The substrate 11 is glass, on which the recording film 13 having soft magnetic film is sputtered. The recording film 13 has a permalloy film of 0.3 μm, and 81.5 at % Co—18.5 at % Cr of 0.9 μm. The permalloy film is provided to decrease the write current as described in accordance with FIGS. 8 and 9. The reproducing film 12 made of 77 at % Fe − 23 at % Tb is produced at a thickness of 0.1 μm. Table 3 shows the magnetic characteristics of the recording film Co—Cr, and the reproducing film Tb—Fe. The non-magnetic intermediate film 24 between the recording film 13 and the reproducing film 12 is made of $SiO_2$, with the thickness 0, 0.5, 0.1, 0.2 and 0.4 μm. The protection film 22 made of $SiO_2$ with the thickness 0.1 μm is also coated.

TABLE 3

|  | 88.5 at % Co – 21.5 at % Cr | 23 at % Tb – 77 at % Fe |
| --- | --- | --- |
| Coercive force (Oe) | 1000 | 15000 |
| Saturate magnetism (emu/cc) | 400 | 50 |
| Curie temperature (°C.) | 600 | 125 |

The write signal with the bit length 10 μm is stored in the recording film with the magnetic field 300 Oe. Next, the recording medium is heated up to 140° C. in vacuum condition to transfer the magnetic pattern on the recording film to the reproducing film. Next, the signal is reproduced with the laser beam having the laser power 1 mW.

Figure 11:
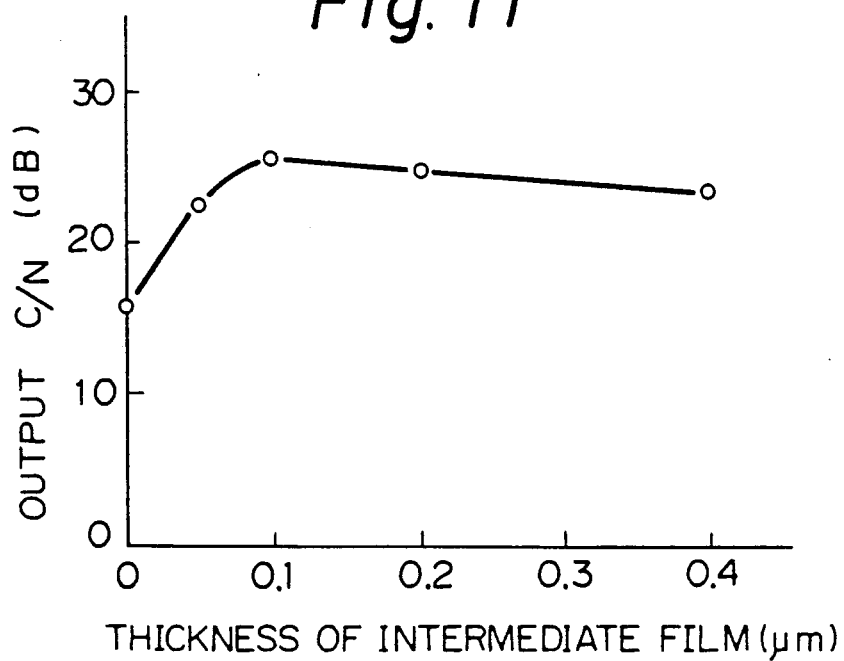
FIG. 11 shows the characteristics curve of the embodiment of FIG. 10.

FIG. 11 shows the experimental curve in which the horizontal axis shows the thickness of the non-magnetic intermediate film, and the vertical axis shows the C/N (carrier to noise ratio in dB) of the reproduced signal. FIG. 11 shows that the value C/N is maximum when the thickness is 0.1–0.2 μm. When the non-magnetic film is too thick, the transfer of the desired signal becomes incomplete, and so, the value C/N decreases. The desired thickness of the non-magnetic intermediate film is 1–2 times the width of a small reverse magnetic domain.

It should be noted that any combination of the above embodiments is possible to those skilled in the art. For instance, the structure of the recording medium may be one of the embodiments of FIG. 1, FIG. 7, FIG. 8 and FIG. 10. Any structure of the recording medium may have a structure for providing a sector information by one of the embodiments of FIGS. 4 through 6. In any type of recording medium, the sequence of the recording film and the reproducing film is arbitrary, in other words, the recording film is attached on the substrate and the reproducing film is attached on the recording film, or the reproducing film is attached on the substrate and the recording film is attached on the reproducing film. The soft magnetic film may be inserted between the recording film and the substrate in any embodiment, and the non-magnetic intermediate film may be provided between the recording film and the reproducing film in any embodiment. The protection layer may be used in any embodiment.

From the foregoing, it will now be apparent that a new and improved magneto-optic recording system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A magneto-optic recording system comprising:
   a magneto-optic recording medium comprising a substrate having a plurality of data tracks, said substrate being provided with a first recording magnetic film with a predetermined first Curie temperature and a predetermined first coercive force, and a second reproducing magnetic film with a predetermined second Curie temperature and a predetermined second coercive force, said first Curie temperature being higher than said second Curie temperature, and said first coercive force being lower than said second coercive force, said recording medium is magnetically recorded with sector information extended in a perpendicular direction to and across the direction of a data track, said sector information provides a clock signal for showing a start point of the recording signal for use in synchronization between a recorded signal and a reproduced signal,
   a magnetic head positioned close to said magneto-optic recording medium, having a core and a coil wound on the core, to magnetically record a magnetic pattern signal applied to said coil onto the first magnetic film, said magnetic head generates a magnetic field which is higher than said first coercive force and is lower than said second coercive force;
   heating means located downstream along a relative moving path of said recording medium from said magnetic head, said heating means for selectively heating said recording medium to a temperature which is higher than said second Curie temperature and lower than said first Curie temperature, in order to transfer said recorded magnetic pattern recorded on said first magnetic film to said second magnetic film; and
   an optical head having at least a laser source and a laser sensor, located close to the recording medium, and downstream along a relative moving path of said medium from said magnetic head for reproducing signals transferred on said second magnetic film by irradiating said second magnetic film with a coherent laser beam and sensing the polarized angle of the reflected beam from said medium which is dependent upon the signals transferred on the second magnetic film.

2. A magneto-optic recording system according to claim 1, wherein said laser source in said optical head doubles as said heating means wherein said laser source generates a laser beam strong enough for heating the recording medium to a temperature higher than said second Curie temperature.

3. A magneto-optic recording system according to claim 1, wherein said first magnetic film has a vertical magnetization direction directing in a thickness direction of the first magnetic film.

4. A magneto-optic recording system according to claim 1, wherein said first magnetic film has a longitudinal magnetization direction directing in a plane direction of the first magnetic film.

5. A magneto-optic recording system according to claim 1, wherein said recording medium has a soft magnetic film between said substrate and said two magnetic films.

6. A magneto-optic recording system according to claim 1, wherein said recording medium has a non-magnetic film between said first magnetic film and said second magnetic film.

7. A magneto-optic recording system according to claim 1, wherein said second magnetic film is provided on the substrate and said first magnetic film is provided on said second magnetic film, said substrate is transparent, and said optical head is positioned on the opposite side of the substrate of said magnetic head.

8. A magneto-optic recording system according to claim 1, wherein said first magnetic film is provided on the substrate and said second magnetic film is provided on said first magnetic film, and said optical head is positioned on a same side of the substrate as that of the magnetic head.

9. A magneto-optic recording system according to claim 1, wherein said heating means heats only a part of the recording medium magnetized by said magnetic head.

10. A magneto-optic recording medium comprising:
   a substrate having a plurality of recording tracks and being provided with a first recording magnetic film and a second reproducing magnetic film;
   said first recording magnetic film having a predetermined first Curie temperature and a predetermined first coercive force;
   said second reproducing magnetic film having a predetermined second Curie temperature and a second coercive force;
   said first Curie temperature being higher than said second Curie temperature, and said first coercive force being lower than said second coercive force wherein said first recording magnetic film and said second reproducing magnetic film are initially, magnetically recorded with sector information extended in a perpendicular direction to and across the direction of a recording track of said recording track.

11. A magneto-optic recording medium according to claim 10, wherein said first magnetic film is for vertical recording.

12. A magneto-optic recording medium according to claim 10, wherein said first magnetic film is for longitudinal recording.

13. A magneto-optic recording medium according to claim 10, wherein a soft magnetic film is provided between said substrate and said first and second magnetic films.

14. A magneto-optic recording medium according to claim 10, wherein a non-magnetic film is inserted between said first magnetic film and said second magnetic film.

15. A magneto-optic recording medium according to claim 10, wherein said second magnetic film is provided on the substrate, and said first magnetic film is provided on the second magnetic film, and said substrate is optically transparent.

16. A magneto-optic recording medium according to claim 10, wherein said first magnetic film is provided on the substrate, and said second magnetic film is provided on the first magnetic film.

17. A magneto-optic recording medium according to claim 10, wherein said first magnetic film is Co—Cr, and said second magnetic film is Tb—Fe.

18. A magneto-optic recording medium according to claim 10, wherein said first and said second magnetic films are amorphous of rare earth element and transition metal alloy.

19. A magneto-optic recording system comprising:
   a magneto-optic recording medium comprising a substrate having a plurality of data tracks, said substrate being provided with a first recording magnetic film with a predetermined first Curie temperature and a predetermined first coercive force, and a second reproducing magnetic film with a predetermined second Curie temperature and a predetermined second coercive force, said first Curie temperature being higher than said second Curie temperature, and said first coercive force being lower than said second coercive force, said substrate is provided with grooves extended in a direction perpendicular to and across said data tracks for showing a starting point of a recording signal to provide synchronization between the recording signal and a reproducing signal;
   a magnetic head positioned close to said magnetooptic recording medium, having a core and a coil wound on the core, to magnetically record a magnetic pattern signal applied to said coil onto said first magnetic film, said magnetic head generates a magnetic field which is higher than said first coercive force and is lower than said second coercive force;
   heating means located downstream along a relative moving path of said recording medium from said magnetic head, said heating means for selectively heating said recording medium to a temperature which is higher than said second Curie temperature and lower than said first Curie temperature, in order to transfer said recorded magnetic pattern recorded on said first magnetic film to said second magnetic film; and
   an optical head having at least a laser source and a laser sensor, located close to the recording medium and downstream along a relative moving path of said medium from said magnetic head, for reproducing signals transferred on said second magnetic film by irradiating said second magnetic film with a coherent laser beam and sensing the polarized angle of the reflected beam from said medium which is dependent upon the signals transferred on the second magnetic film.

20. A magneto-optic recording system according to claim 19, wherein said laser source in said optical head doubles as said heating means wherein said laser source generates a laser beam strong enough for heating the recording medium to a temperature higher than said second Curie temperature.

21. A magneto-optic recording system according to claim 19, wherein said first magnetic film has vertical magnetization direction directing in a thickness direction of the first magnetic film.

22. A magneto-optic recording system according to claim 19, wherein said first magnetic film has a longitudinal magnetization direction directing in a plane direction of the first magnetic film.

23. A magneto-optic recording system according to claim 19, wherein said recording medium has a soft magnetic film between said substrate and said first and second magnetic films.

24. A magneto-optic recording system according to claim 19, wherein said recording medium has a non-magnetic film between said first magnetic film and said second magnetic film.

25. A magneto-optic recording system according to claim 19, wherein said second magnetic film is provided on the substrate and said first magnetic film is provide don said second magnetic film, said substrate is transparent, and said optical head is positioned on an opposite side of said substrate to said magnetic head.

26. A magneto-optic recording system according to claim 19, wherein said first magnetic film is provided on the substrate and said second magnetic film is provided on said first magnetic film, and said optical head is positioned on a same side of the substrate with the magnetic head.

27. A magneto-optic recording system according to claim 19, wherein said heating means heats only a part of the recording medium magnetized by said magnetic head.

28. A magneto-optic recording medium comprising:

a substrate having a plurality of recording tracks and being provided with a first recording magnetic film and a second reproducing magnetic film;

said first recording magnetic film having a predetermined first Curie temperature and a predetermined first coercive force;

said second reproducing magnetic film having a predetermined second Curie temperature and a second coercive force;

said first Curie temperature being higher than said second Curie temperature, and said first coercive force being lower than said second coercive force, wherein said substrate has a groove preformed and extended in a direction perpendicular and across the direction of the tracks and said first and second magnetic films are initially, magnetically recorded with sector information extended in said perpendicular to and across the direction of a recording track of said recording tracks.

29. A magneto-optic recording medium according to claim 28, wherein said first magnetic film has a vertical magnetization direction.

30. A magneto-optic recording medium according to claim 28, wherein said first magnetic film has a longitudinal magnetization direction.

31. A magneto-optic recording medium according to claim 28, wherein a soft magnetic film is provided between said substrate and said first and second magnetic films.

32. A magneto-optic recording medium according to claim 28, wherein a non-magnetic film is inserted between said first magnetic film and said second magnetic film.

33. A magneto-optic recording medium according to claim 28, wherein said second magnetic film is provided on the substrate, and said first magnetic film is provided on the second magnetic film, and said substrate is optically transparent.

34. A magneto-optic recording medium according to claim 28, wherein said first magnetic film is provided on the substrate, and said second magnetic film is provided on the first magnetic film.

35. A magneto-optic recording medium according to claim 28, wherein said first magnetic film is Co—Cr, and said second magnetic film is Tb—Fe.

36. A magneto-optic recording medium according to claim 28, wherein said first and said second magnetic films are amorphous of rare earth element and transition metal alloy.

* * * * *